United States Patent
Neustadtl

(10) Patent No.: US 6,199,920 B1
(45) Date of Patent: *Mar. 13, 2001

(54) CONNECTING PIECE FOR PROFILED PIPES, PROFILED NIPPLES, CORRUGATED TUBES OR THE LIKE ELONGATE ARTICLES

(75) Inventor: Paul Neustadtl, Graz (AT)

(73) Assignee: Interflex S.A., Montcada I Reixac (ES)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,316

(22) PCT Filed: Oct. 19, 1996

(86) PCT No.: PCT/EP96/04554

§ 371 Date: Jul. 6, 1998

§ 102(e) Date: Jul. 6, 1998

(87) PCT Pub. No.: WO97/16671

PCT Pub. Date: May 9, 1997

(30) Foreign Application Priority Data

Oct. 28, 1995 (DE) .............................. 195 40 279

(51) Int. Cl.$^7$ .............................. F16L 37/14; F16L 55/00
(52) U.S. Cl. ......................... 285/322; 285/903; 285/319
(58) Field of Search .................................. 285/903, 319, 285/322, 323

(56) References Cited

U.S. PATENT DOCUMENTS

| | | | |
|---|---|---|---|
| 4,542,922 | * | 9/1985 | Grossauer ............................ 285/903 |
| 4,625,998 | * | 12/1986 | Draudt et al. ........................ 285/903 |
| 4,836,580 | | 6/1989 | Farrell . |
| 4,989,905 | * | 2/1991 | Rajecki ............................... 285/903 |
| 5,042,844 | * | 8/1991 | Iida et al. ............................. 285/903 |
| 5,112,086 | * | 5/1992 | Gruber et al. ....................... 285/903 |
| 5,275,443 | * | 1/1994 | Klinger ................................ 285/319 |
| 5,320,390 | * | 6/1994 | Kodama et al. ..................... 285/319 |
| 5,356,181 | * | 10/1994 | Shirogane et al. ................... 285/903 |
| 5,370,423 | * | 12/1994 | Guest ................................... 285/322 |
| 5,407,236 | * | 4/1995 | Schwarz et al. ..................... 285/903 |
| 5,511,827 | * | 4/1996 | Steinkamp et al. ................. 285/319 |
| 6,036,237 | * | 3/2000 | Sweeney ............................. 285/322 |

FOREIGN PATENT DOCUMENTS

| | | | |
|---|---|---|---|
| 4334529 | * | 4/1994 | (DE) .................................. 285/322 |
| 73892 | * | 3/1983 | (EP) .................................. 285/903 |
| 454630 | * | 10/1991 | (EP) .................................. 285/322 |
| 579194 | * | 1/1994 | (EP) .................................. 285/322 |

* cited by examiner

Primary Examiner—Eric K. Nicholson
(74) Attorney, Agent, or Firm—Pitney, Hardin, Kipp & Szuch LLP

(57) ABSTRACT

A connecting piece into which is axially insertable in an insertion direction a profiled pipe member having parallel external grooves, where the connecting piece includes a connecting sleeve having an entry end for receiving the profiled pipe member and defines a cylindrical wall with plurality of apertures extending radially therethrough, and a clamping ring which is axially displaceable in the connecting sleeve and which is provided with a plurality of pressure fingers extending approximately parallel to a longitudinal axis of the sleeve and which are pivotable about a pivot region. In a fixing position each of the pressure fingers is positioned generally adjacent a respective one of the apertures, each pressure finger having a projecting nose part which is engagable into one of the external grooves of the profiled pipe member. For release of the profiled pipe at least one of the apertures defines at the inside of the connecting sleeve a transverse edge which includes a barrier portion which projects from the transverse edge in a direction opposite to the insertion direction, the barrier portion having a sloping surface which is inclined outwardly from the insertion direction and the pressure finger has an inner surface which bears slidably against the sloping surface of the barrier portion causing the pressure finger to move radially outward and out of contact with the groove of the profiled pipe.

10 Claims, 6 Drawing Sheets

Figure 1:
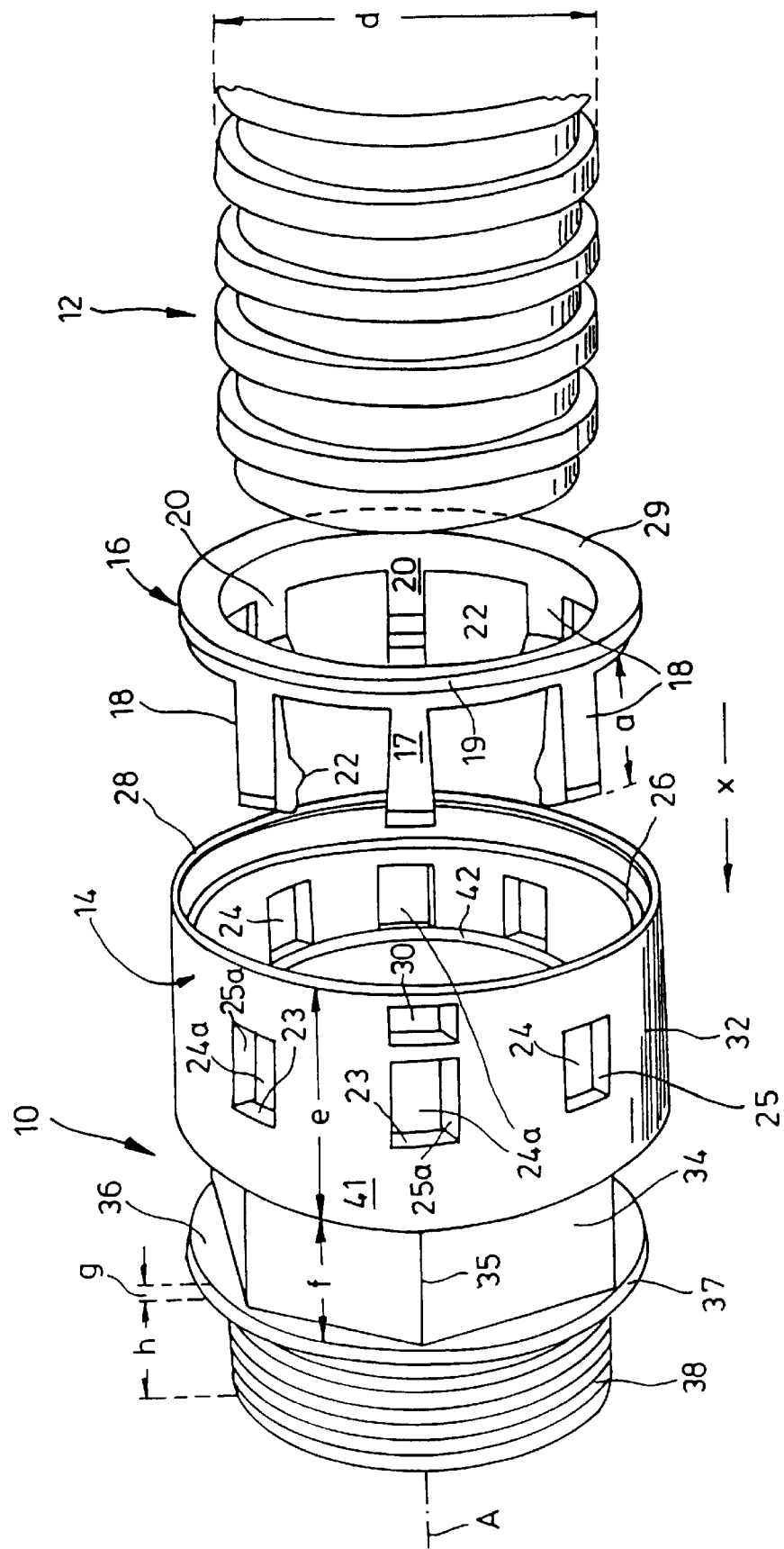

CONNECTING PIECE FOR PROFILED PIPES, PROFILED NIPPLES, CORRUGATED TUBES OR THE LIKE ELONGATE ARTICLES

The invention concerns a connecting piece for profiled nipples, corrugated tubes or the like profiled pipes with parallel external grooves, as set forth in the classifying portion of the independent claim.

Such connecting pieces with corrugated tubes are used predominantly in electrical engineering for protecting electrical lines, in a special profiled pipe configuration with sealing means as an air pipe in the pneumatic art or for the transportation of fluid media, for example water.

A connecting element having a carrier ring in the form of a sliding sleeve comprising an abutment ring, an axial inner ring arranged at a spacing relative thereto, legs connecting the abutment ring and the inner ring, and limbs which extend from the inner ring to the abutment ring and which have locking claws towards the corrugated pipe are disclosed for example in EP 0 465 896 A1 or U.S. Pat. No. 4,836,580.

It has been found that apparatuses of that kind suffer from the disadvantage of a low level of operational security, in regard to the movable sliding sleeve, and the structural size thereof. A movable sliding sleeve permits repeated assembly and release of profiled pipes. In the case of existing apparatuses with a movable sliding sleeve—without counterpressure—operational vibration or unskilled handling, the random effects of knocks and pressure or simple sabotage can already call the aspect of operational security into question, that is to say, accidental release of the profile from the fitting is possible at any time. In addition use reduces the return force.

A connecting piece of the general kind set forth for connection to a flexible corrugated tube is known from DE 43 34 529 A1 in the form of a comparatively structurally complicated combination of a connecting sleeve with a plurality of window-like apertures and a member which is axially displaceable in the connecting sleeve and which has pressure fingers which are integrally formed on the member and which are pivotable about a pivot region. The displaceable member is a double-casing portion with openings in a ring surface which connects the double casing at the outward side. The inner casing is formed by six pressure fingers and the outer casing serves as a gripping portion. Projections on the connecting sleeve engage into the openings in the ring surface of the double casing, so that there is an indication as to whether the flexible corrugated tube can be separated from the connecting device. At least however in this case also use reduces the return force of the pressure fingers which serve as locking claws, upon frequent operation of the connecting piece, that is to say when opening and fixing the profiled pipe. The satisfactory release thereof cannot be guaranteed.

The aim of the present invention is to eliminate the recognised disadvantages of connecting pieces of the kind set forth in the opening part of this specification.

That object is attained by the teaching set forth in independent claim 1. The appendant claims set forth desirable developments.

In accordance with the teaching of claim 1 the axially displaceable member is in the form of a clamping ring and arranged in front of same in opposite relationship to the insertion direction of the profiled pipe, is an annular groove or annular notch which extends at least over a part of the peripheral surface. In addition, an engagement opening is associated with at least two apertures in the connecting sleeve, preferably adjacent the free edge thereof; by virtue of those engagement openings, it is possible for example by means of the end of a screwdriver to engage the clamping ring through the connecting sleeve, and displace it axially. By virtue of those measures therefore in the assembled condition on the one hand per se known rapid manual unlocking is possible, without a loading. On the other hand however security unlocking is afforded, with an axial counterpressure, which can be released only with the intentional use of an ancillary tool. In the event of an axial counterpressure sliding movement—for example upon disassembly—the pressure fingers are so positioned over inclined sloping surfaces that the corrugated pipe can be unlocked.

During the axial displacement of the clamping ring in opposition to the pulling direction, which displacement is to be effected by hand by the operator, the pressure fingers are pressed against by a barrier portion having an outwardly inclined sloping surface, the barrier portion being provided in a particular development in each of the apertures at the inside of the connecting sleeve, until the pressure fingers engage with their noses into the corrugated pipe.

In accordance with a further feature of the invention the barrier portions each project at the inside of the connecting sleeve from the transverse edge of the respective aperture, which is in opposite relationship to the insertion direction; extending from the upper edge of the barrier portion is the outwardly inclined sloping surface against which slidably bears the inner sloping surface of the pressure finger. In the opposite direction, the nose of the pressure finger—which in turn is provided with an inclined sloping surface—is lifted, which results in the corrugated tube being freed. The displaceable clamping ring can also be pressed in the opposite direction by means of a screwdriver or a forked or open-end wrench; that also frees the profiled pipe.

In accordance with a particular development the free end of the pressure finger is formed by a base line—in particular a crest or ridge—in order to guarantee co-operation of the sloping surfaces. That base line is defined in the radial cross-section by two sloping surfaces of the pressure finger, which are inclined relative to each other and of which one goes into the nose and of which the other connects to the external face of the pressure finger.

Advantageously each base line, in radial cross-section, is defined by an inner sloping surface which is inclined away from the nose in the rest position of the pressure finger, and a part-circular curvature region which forms a transition into an inclined rear face of the pressure finger. In the sliding operation the rear face of the pressure finger slides along the connecting sleeve. The external face or the rear face of the pressure finger serves upon insertion of the clamping ring as a sliding face, the counterpart of which is preferably an inner projection on the connecting sleeve.

All in all the invention provides a construction which constitutes a development of the apparatus of the general kind set forth and which attains the object viewed by the inventor in an outstandingly simple manner. It is also advantageous that unintentional actuation of the apparatus remains out of the question; as stated, release of the profiled pipe is to be implemented by means of an ancillary tool.

Figure 4:
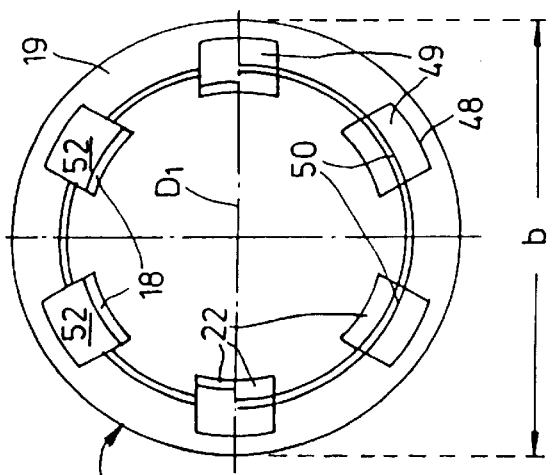
Figure 3:
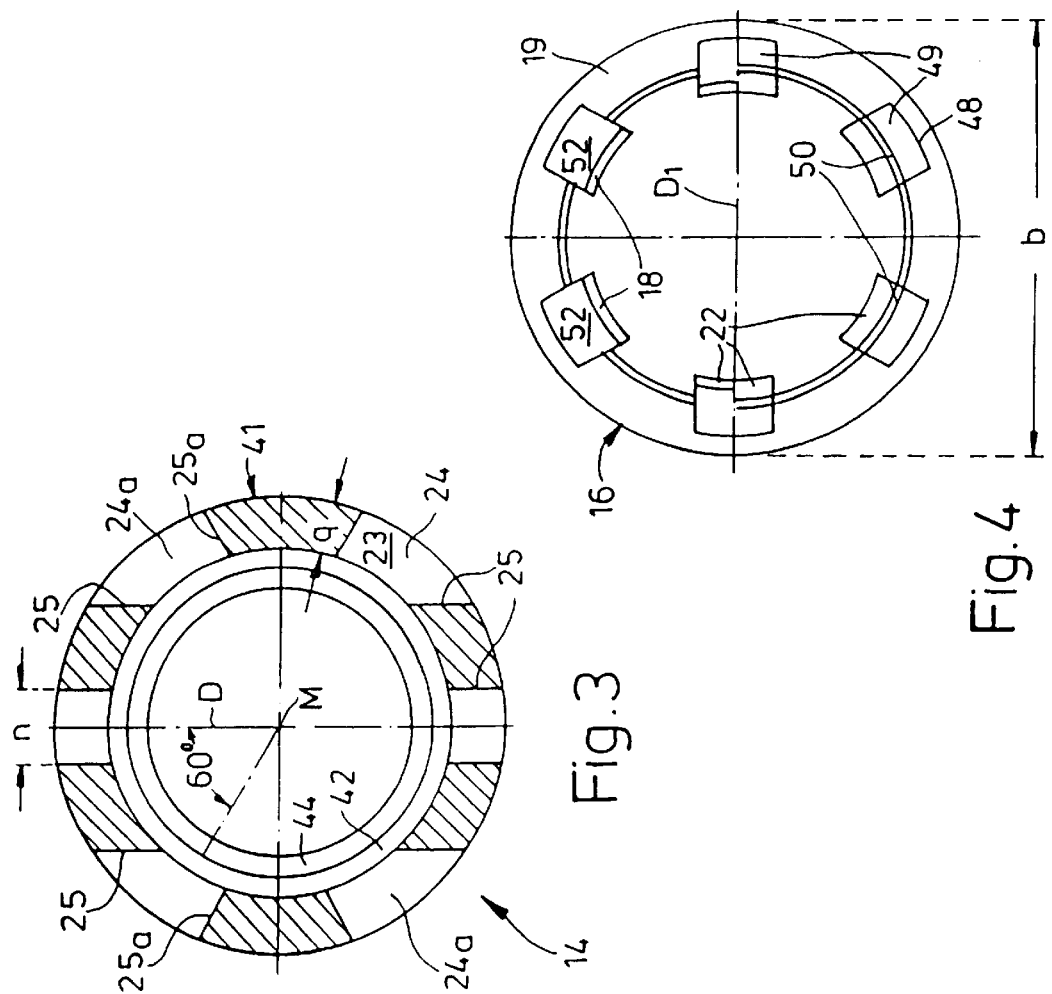
Figure 2:
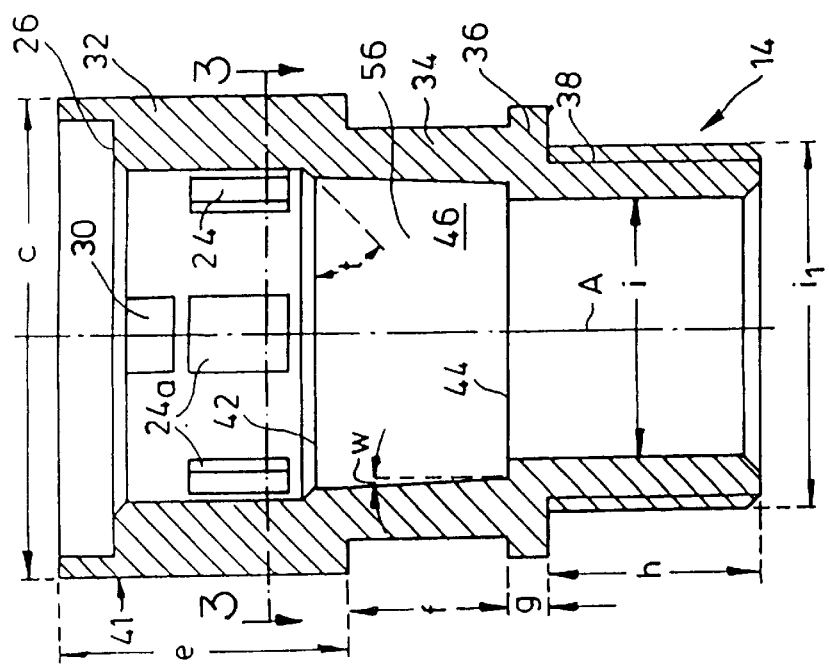
Figure 5:
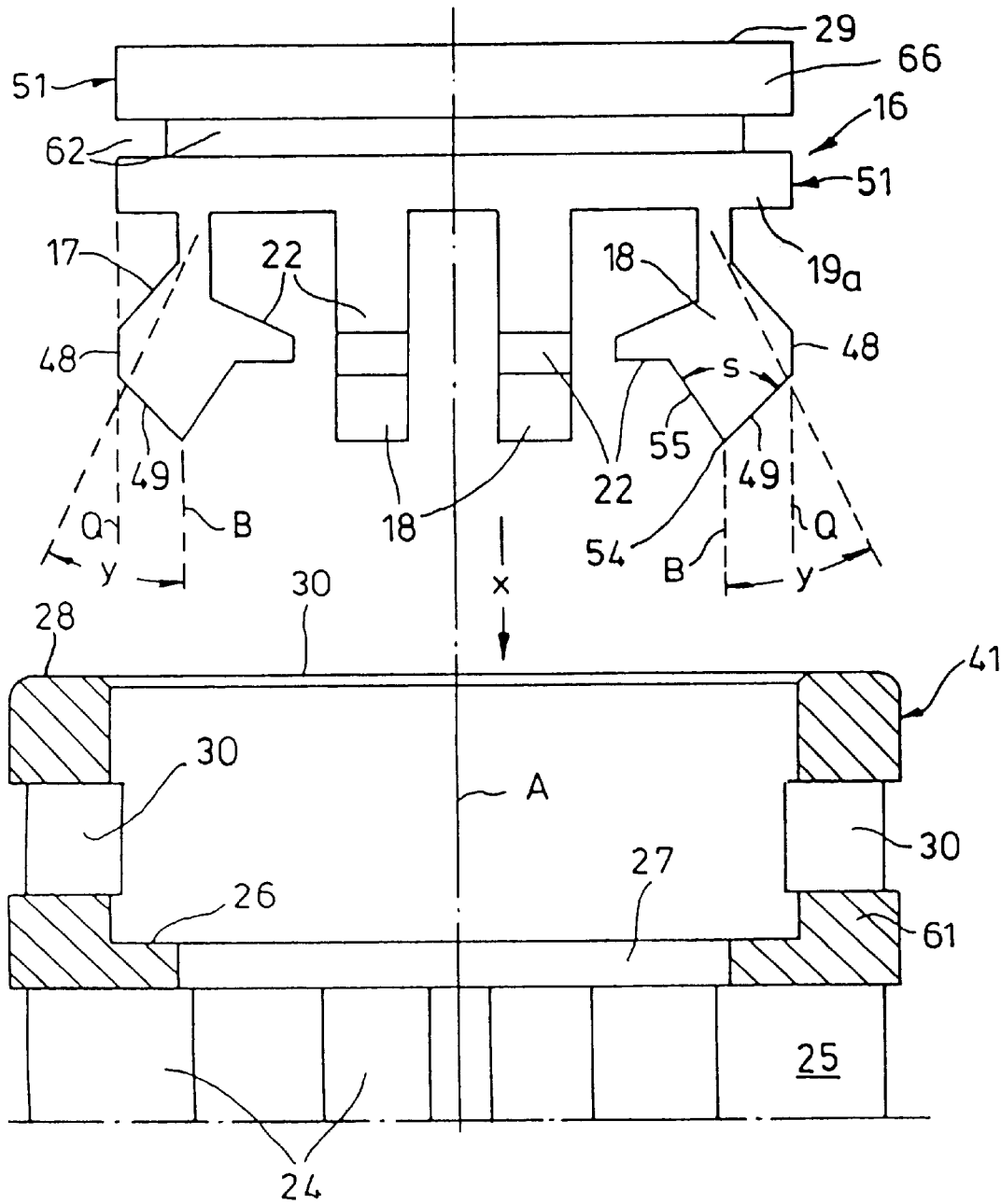
Figure 6:
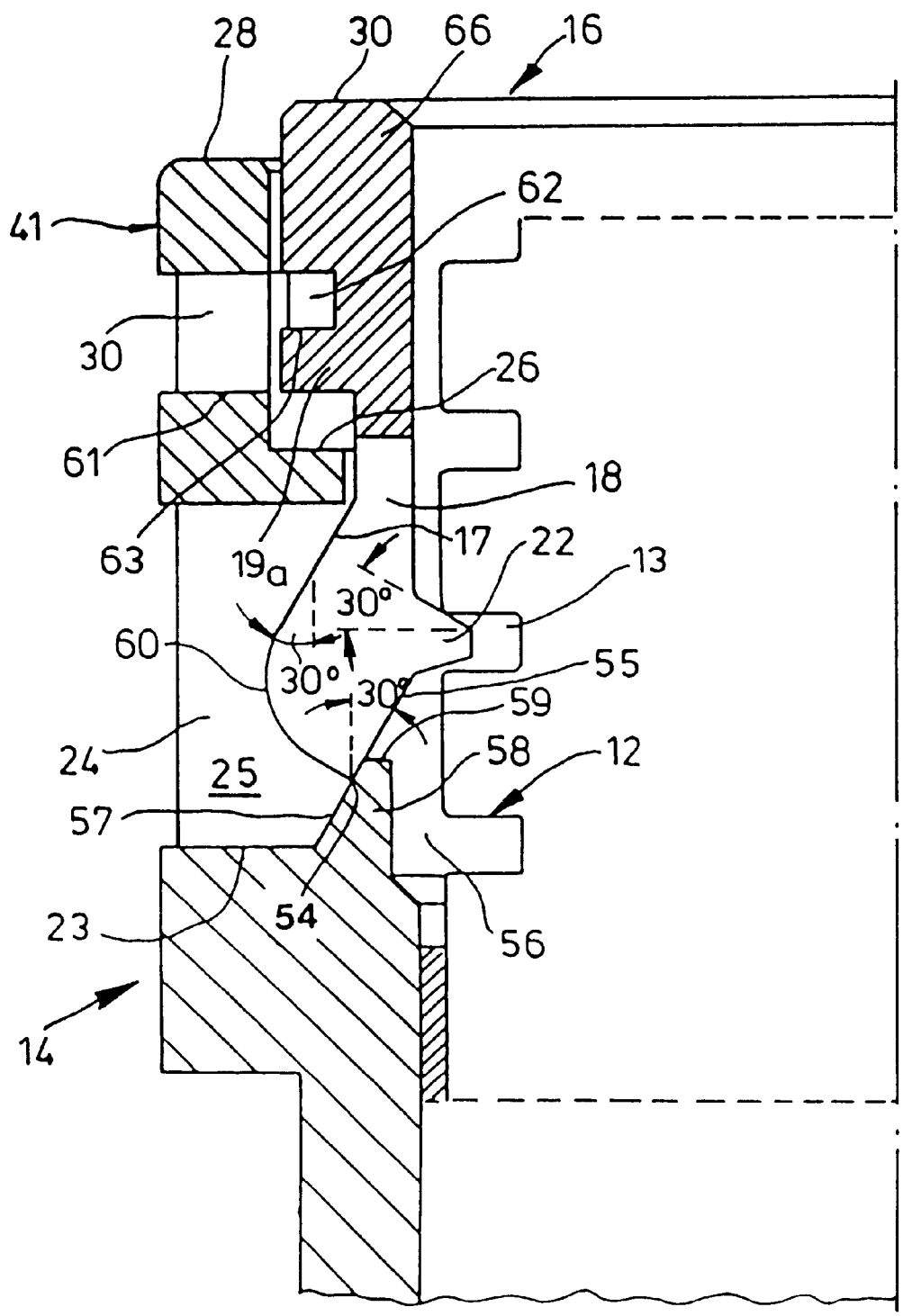
Figure 7:
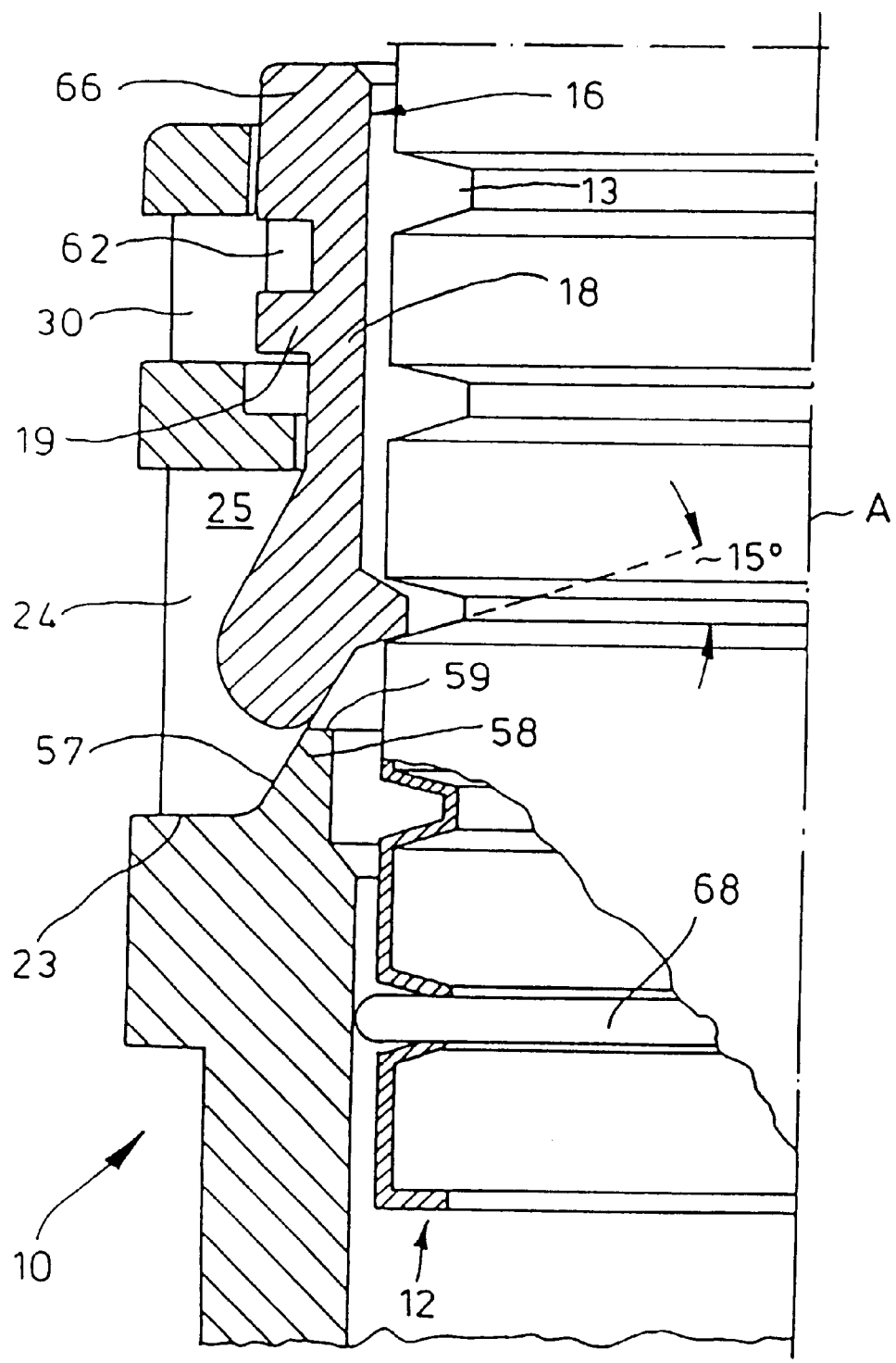
Figure 8:
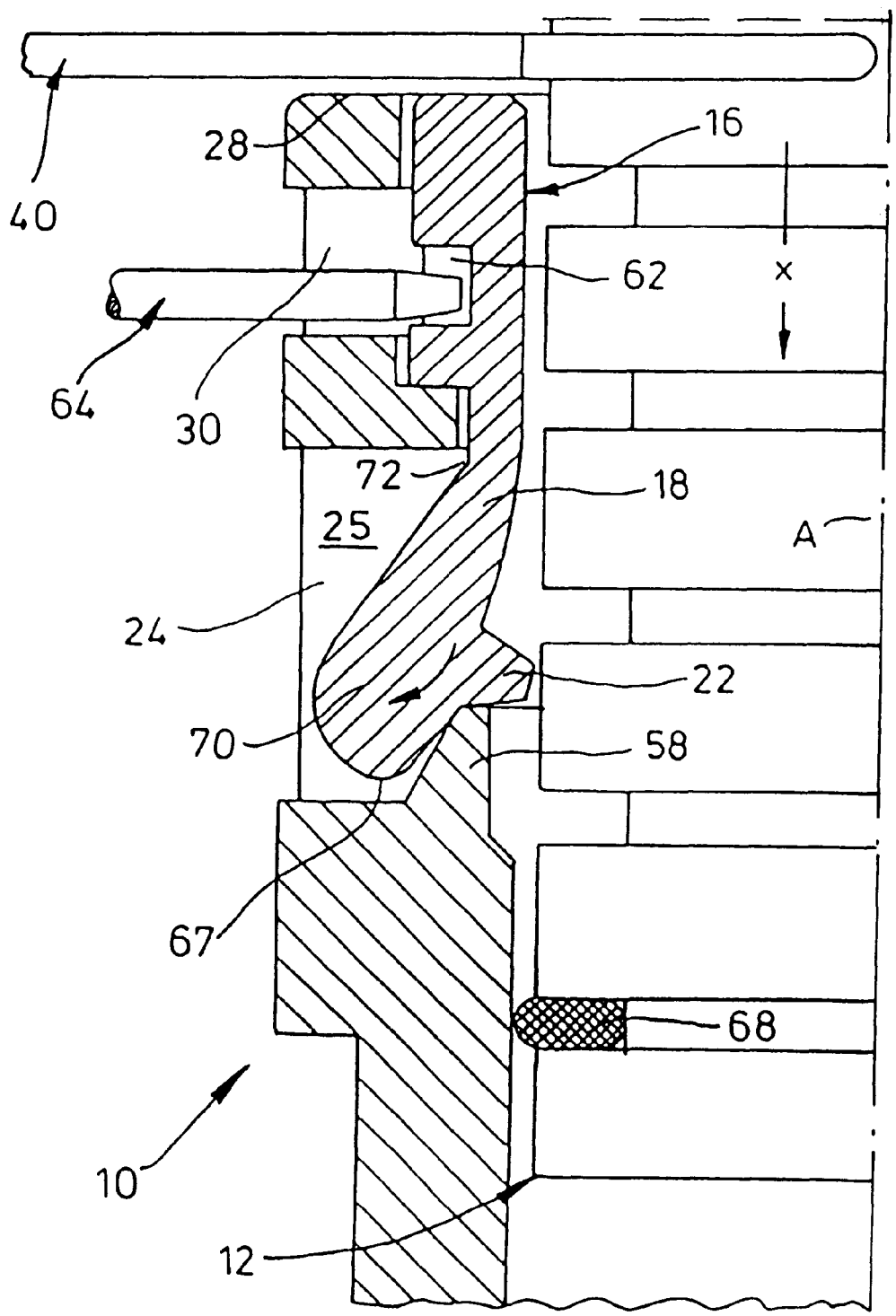

Further advantages, features and details of the invention are apparent from the following description of preferred embodiments and with reference to the drawing in which:

FIG. 1 is an exploded perspective view of a connecting piece comprising a connecting sleeve with associated clamping ring for a corrugated tube, FIG. 2 is a view in longitudinal section through the connecting sleeve of the connecting piece, in section in a plane through the longitudinal axis of the system, FIG. 3 is a view in cross-section through FIG. 2 on line III—III therein, FIG. 4 is a plan view of the clamping ring in opposite relationship to the insertion direction in two embodiments, FIG. 5 is a side view of the clamping ring over a configuration of the connecting sleeve, shown in section, FIG. 6 is a partially cross-sectional view on an enlarged scale in relation to FIGS. 2 through 4, through the two-part connecting piece with inserted corrugated tube, and FIGS. 7 and 8 are two diagrammatic partially cross-sectional views through the embodiment of FIG. 6 in a different operating condition of the connecting piece and in the unlocking position.

A connecting piece 10 for a corrugated tube, indicated at 12, of circular cross-section of an outside diameter d of between 8 and 50 mm—in the selected embodiment by way of example about 16.0 mm—comprises a cylindrical connecting sleeve 14 and a clamping ring 16 which can be axially fitted thereinto and from which pressure fingers 18 which are formed thereon at one end, of a free length a of 6 mm, project in the insertion direction x, that is to say approximately parallel to the longitudinal axis a of the system, the present example having six thereof. The connecting sleeve 14 and the clamping ring 16 are preferably produced from a polyamide material (PA).

The clamping ring 16 which forms an inner sliding sleeve has an outer radial flange 19 and a bar-like transverse nose 22 is formed out of the inside surface 20 of each of the pressure fingers 18 which increase in width in a wedge-like configuration in longitudinal section towards the free end.

The clamping ring 16 whose outer diameter b here measures 21.5 mm can be inserted into the connecting sleeve 14 of an outside diameter c of 26 mm in such a way that the pressure fingers 18 are each disposed at the inside in front of a rectangular aperture 24 in the connecting sleeve 14 and the radial flange 19 bears against an internal shoulder surface 26 of the connecting sleeve 14; in the example shown in FIG. 8 the edge 28 thereof is aligned in that position with the ring surface 29 of the clamping ring 16.

The one-piece connecting sleeve 14 itself provides four regions, namely an annular sleeve 32 of a length e of here about 15 mm which adjoins the edge 28 and which includes a—here six window-like apertures 24 and over two oppositely disposed apertures 24 a pair of engagement openings 30, a gripping ring 36 of hexagonal cross-section of a length f of 8 mm, a transverse plate portion 36 of a thickness g of 2 mm which defines the gripping ring 34 on the other side, and a screwthreaded nipple portion 38 of a length h for example of 10 mm.

The annular edge 37 of the transverse plate portion 36 forms approximately the geometrical location for corner lines 35, which are parallel to the axis, of the gripping ring 34, to which for example it is possible to fit a wrench indicated at 40 in FIG. 8.

The external surface 41 of the annular sleeve 32 is flat, its internal surface is multiply stepped in the insertion direction x—on the one hand at the above-mentioned shoulder surface 26 and on the other hand at an annular surface 42 which is disposed inclinedly in cross-section relative to the longitudinal axis A at an angle of inclination t of here 45° and which extends towards the screwthread near the apertures 24; a further radially directed shoulder surface 44 forms at the surface of the transverse plate portion 36, which is remote from the screwthread, the internal transition from the screwthreaded nipple portion 38 to the gripping ring 34. The internal surface 46 thereof is inclined inwardly at an angle w of 2° in the insertion direction x to improve the sealing integrity of the assembly. The adjoining inside diameter i of the screwthreaded nipple portion 38 measures 13 mm while its outside diameter $i_1$ is about 18 mm.

FIG. 3 in particular shows that two of the apertures 24 are disposed in mutually diametrally opposite relationship and have side faces 25 in parallel relationship to a diametral straight line D at a spacing n of 4.5 mm. In parallel relationship therewith are the adjacent side faces 25 of other apertures $24^a$, at each of which respective other side faces $25_a$ are directed almost radially with respect to the centre point M of the cross-section. The dimension of the wall thickness q of the annular sleeve 32 moreover approximately corresponds to the above-mentioned spacing n and thus the narrowest aperture width.

FIG. 4 shows two embodiments of the pressure fingers 18 of the clamping ring 16, more specifically beneath a diametral straight line $D_1$ a configuration with a transverse nose 22, an external rib surface 48 with adjoining sloping surface 49 and an end face 50 which is parallel to the ring surface 29; above the diametral straight line $D_1$ there are pressure fingers 18 of wedge-shaped longitudinal section with the transverse nose 22 and an approximately square base surface 52 which is also disposed approximately parallel to the surface 29.

When the corrugated tube 12 is inserted in the insertion direction x into the connecting piece 10 the transverse noses 22 of the pressure fingers 18 engage into one of the peripheral grooves 13 around the corrugated tube 12, in which case the free ends of the pressure fingers 18 can temporarily deflect outwardly in the region of the apertures 24, $24^a$; the material of the clamping ring 16 is springily resilient.

The pressure fingers 18 in FIG. 5 terminate in a downward direction in a base line 54 between the outer sloping surface 49 and an inner sloping surface 55 which together form a cross-sectional angle s of almost 90°. The external rib surface 48 which adjoins the outer sloping surface 49 is here aligned with the peripheral surface 51 of the radial flange $19^a$—auxiliary straight line Q—and can therefore be inserted without radial pressure into the connecting sleeve 14. The sloping surface 49, the external rib surface 48 and the rear face 17 of the pressure finger 18 slide over a projection 27 on the connecting sleeve 14, the projection affording the shoulder surface 26, and after that projection slide back into their previous—stress-free—rest position.

This is indicated in FIG. 5 by lines parallel to the longitudinal axis A of the system, adjoined by the pivotal angle y which extends from the pivot location of the pressure finger 18.

By virtue of an angle of inclination z of more than 5°—preferably about 8°—of the rear face 17 of the pressure finger 18 relative to the longitudinal axis A, the pressure finger, upon a movement in opposite relationship to the insertion direction x, is increasingly pressed into the corresponding peripheral groove 13 of the corrugated tube 12.

In the embodiment shown in FIG. 6, it is possible to see above the aperture 24 whose lower edge 23 is provided towards the interior 56 of the connecting sleeve 14 with an upwardly projecting threshold or barrier portion 58 the engagement opening 30, by virtue of which it is possible to have access to an annular notch or annular groove 62 in the clamping ring 16. By virtue of that annular groove 62, axial displacement of the clamping ring 16 can be effected without any problem by means of a radially applied screwdriver or the like tool 64 (FIG. 8). The annular groove 62 is disposed in an extension ring portion 66 formed on the radial flange $19_a$.

In the final position of the system the radial flange $19_a$ sits on the shoulder surface 26 and the lower transverse edge 61 of the engagement opening 30 is aligned with the adjacent wall 63 of the annular groove 62. In that case the base line 54 in the form of an acute ridge or crest of the pressure finger 18 is also supported at the point of intersection of the transverse edge 23 with an inclined sloping surface 57 of the barrier portion 58. The transverse nose 22 which engages into a peripheral groove 13 in the corrugated tube 12 then sits on the top edge 59 of the barrier portion 58.

In the operative condition of the corrugated tube 12 shown in FIG. 6 the inclined rear face 17 of the pressure finger 18, which adjoins a part-circular curvature region 60, is moved to the upper edge of the aperture 24; the annular groove 62 of the clamping ring 16 is disposed in the upper region of the engagement opening 30.

FIG. 7 shows a configuration corresponding to that described with reference to FIG. 6 with a corrugated tube 12 in the operative condition.

It is additionally sealed within the connecting piece 10 by an O-ring 68 fitted into one of the peripheral grooves 13. FIG. 8 is intended clearly to show the unlocking procedure for release of the corrugated tube 12 with a screwdriver 64 as an unlocking aid; the screwdriver 64 which engages through the engagement opening 30 is held parallel to the insertion direction x and displaced in parallel relationship therewith. In that case—as already described—the free end 67 of the pressure finger 18 slides downwardly on the sloping surface 57 and is deflected radially outwardly until the lower limb portion 70 of the pressure finger 18, which limb portion is of a triangular-like configuration in cross-section, is almost entirely inserted into the aperture 24. A pivot or desired bend location provided between the clamping ring 16 and the limb portion 70 is identified at 77 in FIG. 8 for the sake of enhanced clarity of the drawing.

What is claimed is:

1. A connecting piece into which is axially insertable in an insertion direction a profiled pipe member having parallel external grooves transverse of said insertion direction, said connecting piece comprising: (a) connecting sleeve, having an entry end for receiving said profiled pipe member and defining a cylindrical wall with a plurality of apertures extending radially through said wall, and (b) a clamping ring which is axially displaceable in said connecting sleeve and which is provided with a plurality of pressure fingers which extend approximately parallel to a longitudinal axis of said sleeve and which are pivotable about a pivot region wherein, in a fixing position each of said pressure fingers is positioned generally adjacent a respective one of said apertures, each of said pressure fingers having a projecting nose part which is engagable into one of said external grooves of said profiled pipe member, and wherein said pressure fingers have radially outwardly directed external faces disposed within a cylindrical region defined by the outer peripheral surface of said clamping ring and wherein at least one of said apertures defines at the inside of said connecting sleeve a transverse edge which includes a barrier portion which projects from said transverse edge in a direction opposite to said insertion direction, said barrier portion having a sloping surface which is inclined outwardly from said insertion direction, and each of said pressure fingers having an inner surface which bears slidably against said sloping surface of said barrier portion.

2. An apparatus as set forth in claim 1 wherein said clamping ring comprises an annular member from which said pressure fingers extend in said insertion direction, and an annular groove which extends at least over a part of said outer peripheral surface of said clamping ring.

3. Apparatus as set forth in claim 1 wherein there is associated with each of at least two of said apertures an engagement opening which extends radially through said wall, said engagement openings situated in the direction of said entry end relative to said apertures.

4. Apparatus as set forth in claim 1 wherein a free end of each of said pressure fingers defines a ridge extending generally axially in said insertion direction.

5. Apparatus as set forth in claim 4 wherein said ridge of each of said pressure fingers is determined in radial cross-section by two sloping surfaces which are inclined relative to each other and of which one goes into said nose and the other adjoins said external face of said pressure finger.

6. Apparatus as set forth in claim 4 wherein said ridge of each of said pressure fingers is defined in radial cross-section by an inner sloping surface which is inclined away from said nose in the rest position of the pressure finger, and a part-circular curvature region which forms a transition into an inclined rear face of the pressure finger.

7. Apparatus as set forth in claim 1 wherein said external face of each of said pressure fingers serves, upon insertion of the clamping ring, as a sliding surface.

8. Apparatus as set forth in claim 7 wherein the sliding surface engages a projection extending radially inward on said connecting sleeve.

9. Apparatus as set forth in claim 1 wherein said connecting sleeve defines a bore surface, said apparatus further comprising a radially outward extending seal fitted into at least one of said grooves in the profiled pipe for sealingly engaging said bore surface.

10. A connecting piece into which is axially insertable in an insertion direction a profiled pipe member having parallel external grooves transverse of said insertion direction, said connecting piece comprising: (a) connecting sleeve having an entry end for receiving said profiled pipe member and defining a cylindrical wall with a plurality of apertures extending radially through said wall, and (b) a clamping ring which is axially displaceable in said connecting sleeve and which is provided with a plurality of pressure fingers which extend generally parallel to a longitudinal axis of said sleeve and which are resilient and pivotable radially outward, and wherein in a fixing position each of said pressure fingers is positioned generally adjacent a respective one of said apertures, each of said pressure fingers having a nose part projecting radially inward which is engagable into one of said external grooves of said profiled pipe member, and wherein at least one of said apertures defines a transverse edge forming a barrier portion which projects in a direction opposite to said insertion direction, said barrier portion having a sloping surface which is inclined outwardly from said insertion direction and each of said pressure fingers having an inner surface which bears slidably against said sloping surface of said barrier portion, and wherein upon insertion of said profiled pipe member into said connecting piece said nose parts of said pressure fingers move radially inward into said groove of said profiled pipe member, thus axially fixing it relative to said connecting member, and said pressure fingers are subsequently movable radially outward to free said profiled pipe member when said clamping ring is urged axially in said insertion direction such that said inner surfaces of said pressure fingers slidably bear against said sloping surfaces of said barrier portion and said pressure fingers are driven radially outward into the area of said apertures.

* * * * *